United States Patent

Hill

[11] Patent Number: 5,377,243
[45] Date of Patent: Dec. 27, 1994

[54] PASSIVE CONTAINMENT COOLING SYSTEM WITH DRYWELL PRESSURE REGULATION FOR BOILING WATER REACTOR

[75] Inventor: Paul R. Hill, Tucson, Ariz.

[73] Assignee: General Electric Company, San Jose, Calif.

[21] Appl. No.: 138,677

[22] Filed: Oct. 18, 1993

[51] Int. Cl.⁵ .............................................. G21C 15/18
[52] U.S. Cl. ...................................... 376/283; 376/299
[58] Field of Search ............... 376/282, 283, 293, 298, 376/299

[56] References Cited

U.S. PATENT DOCUMENTS

| | | | |
|---|---|---|---|
| 3,899,391 | 8/1975 | Sulzer et al. | 376/283 |
| 4,830,815 | 5/1989 | Gluntz | 376/299 |
| 5,059,385 | 10/1991 | Gluntz et al. | 376/282 |
| 5,080,857 | 1/1992 | Miller et al. | 376/280 |
| 5,082,619 | 1/1992 | Sawyer | 376/283 |
| 5,102,617 | 4/1992 | Gluntz et al. | 376/283 |
| 5,120,494 | 6/1992 | Nazareno et al. | 376/282 |
| 5,282,230 | 1/1994 | Billig et al. | 376/283 |

OTHER PUBLICATIONS

Vierow et al., "BWR Passive Containment Cooling System By Condensation Driven Natural Circulation" (5 pages) (no date).
Nagasaka et al., "Heat Removal Tests Of Isolation Condenser Applied As A Passive Containment Cooling System" (7 pages) (no date).

*Primary Examiner*—Daniel D. Wasil
*Attorney, Agent, or Firm*—J. S. Beulick

[57] ABSTRACT

A boiling water reactor having a regulating valve for placing the wetwell in flow communication with an intake duct of the passive containment cooling system. This subsystem can be adjusted to maintain the drywell pressure at (or slightly below or above) wetwell pressure after the initial reactor blowdown transient is over. This addition to the PCCS design has the benefit of eliminating or minimizing steam leakage from the drywell to the wetwell in the longer-term post-LOCA time period and also minimizes the temperature difference between drywell and wetwell. This in turn reduces the rate of long-term pressure buildup of the containment, thereby extending the time to reach the design pressure limit.

19 Claims, 3 Drawing Sheets

PASSIVE CONTAINMENT COOLING SYSTEM WITH DRYWELL PRESSURE REGULATION FOR BOILING WATER REACTOR

The Government of the United States of America has rights in this invention in accordance with Contract No. DE-AC03-90SF18494 awarded by the Department of Energy.

FIELD OF THE INVENTION

This invention relates generally to protection systems for shutting down a boiling water reactor (BWR) and maintaining it in a safe condition in the event of a system transient or malfunction that might cause damage to the nuclear fuel core, most likely from overheating. In particular, the invention relates to emergency core-cooling systems (ECCS) for supplying water to the reactor core and containment systems for containing steam and radioactivity escaping from the reactor pressure vessel in the event of a loss-of-coolant accident (LOCA) in a BWR.

BACKGROUND OF THE INVENTION

BWRs have conventionally utilized active safety systems to control and mitigate accident events. Those events varied from small break to design base accidents. Passive safety systems have been studied for use in BWRs because of their merits in reducing maintenance and surveillance testing of the safety-related equipment, and in eliminating the need for AC power, thereby improving the reliability of BWR operation and safety. Simplified BWRs (SBWRs) have been designed with passive safety features that provide more resistance to human error in accident control and mitigation.

In accordance with the conventional SBWR containment design, a passive containment cooling system (PCCS) eventually purges essentially all of the drywell nitrogen to the wetwell. This reduction in noncondensable concentration permits the PCCS to operate at full heat removal efficiency. This rate of heat removal will eventually exceed the rate of decay heat production. The drywell pressure will decrease to a value slightly below the wetwell pressure, resulting in opening of the wetwell to drywell vacuum breakers (WWVBs). This will result in a flow of water vapor and nitrogen back into the drywell. Since these WWVBs are designed for protection against large, suddenly imposed negative pressure differentials between wetwell and drywell, the flow rates when the WWVBs open are quite large.

In the passive safety system of the SBWR, the location and size of the WWVBs are such that more nitrogen is admitted to the drywell than is needed to degrade the PCCS heat removal rate to just balance the decreasing decay heat without overshoot. A resulting increase in drywell pressure occurs because of the temporary excess nitrogen inventory in the drywell which reduces the heat transfer efficiency of the PCCS. This excess of nitrogen will require a drywell pressure increase to clear the PCCS vent for control of non-condensables and purge the excess nitrogen back into the wetwell along with some steam. This transient can in turn overshoot and result in another opening of the WWVBs.

The above-described behavior has two negative aspects. First, repeated clearing of the PCCS vent may carry additional steam to the suppression pool, resulting in additional heating of the upper portion of the pool. Second, during the periods of a positive drywell-to-wetwell pressure difference, steam leakage to the wetwell could occur, causing a further increase in wetwell pressure. The resulting energy addition to the suppression pool and wetwell causes an undesirable gradual increase in containment pressure.

SUMMARY OF THE INVENTION

The present invention is an improvement which eliminates the aforementioned disadvantages of the prior art passive safety system. The direct means for preventing the aforementioned heat additions to the suppression pool and wetwell would be to assure that the drywell pressure is not reduced sufficiently to cause opening of the WWVBs. A novel approach to accomplish this is to admit the wetwell steam/nitrogen mixture directly into the intake ducts of the PCCS in a manner such that only enough nitrogen is transferred to just reduce PCCS heat removal and terminate the reduction in drywell pressure. Because only a very low flow rate from the wetwell would be required to accomplish this, a very small PCCS regulating valve (PCCS-RV) can be used for this purpose.

The ideal location for delivery of the gas mixture from the wetwell would be directly into the PCCS intake ducts. The location of the admission point and the geometry of the admission line can be selected to determine the pressure differential that would be maintained between the drywell and the wetwell, and by this choice a range of slight positive to slight negative pressure differential would be possible. If dynamic effects of the PCCS flow are used to control this differential pressure, the value is expected to change in a self-regulating fashion as decay heat falls off.

The sizing of the PCCS-RV and its supply line to the PCCS must be given explicit attention to avoid overshoot behavior either in terms of excessive nitrogen delivery or deficient nitrogen delivery rates for termination or control of the drywell pressure transient. A venturi arrangement can be provided in each PCCS intake duct to provide a differential pressure adequate to allow an efficient and effective PCCS-RV design. A bellows-actuated valve using an adjustable spring counterforce permits a reasonable range of adjustment for the valve opening setpoint. The use of a valve seat and disk arrangement that provides increasing flow with increasing differential pressure permits optimization of the self-regulation characteristics.

An additional benefit of this design feature will be the elimination of WWVB activation caused by PCCS and isolation condenser (IS) heat removal capacity exceeding the rate of steam generation by decay heat and release of sensible heat from the reactor vessel and its internals. This reduces the expected duty cycles on the WWVB following a LOCA, thus improving WWVB performance reliability. This duty reduction decreases the likelihood that the WWVB seat will develop a leak, reducing the potential severity of such leakage during periods of a positive drywell-to-wetwell pressure difference.

DETAILED DESCRIPTION OF THE PREFERRED EMBODIMENTS

Figure 1:
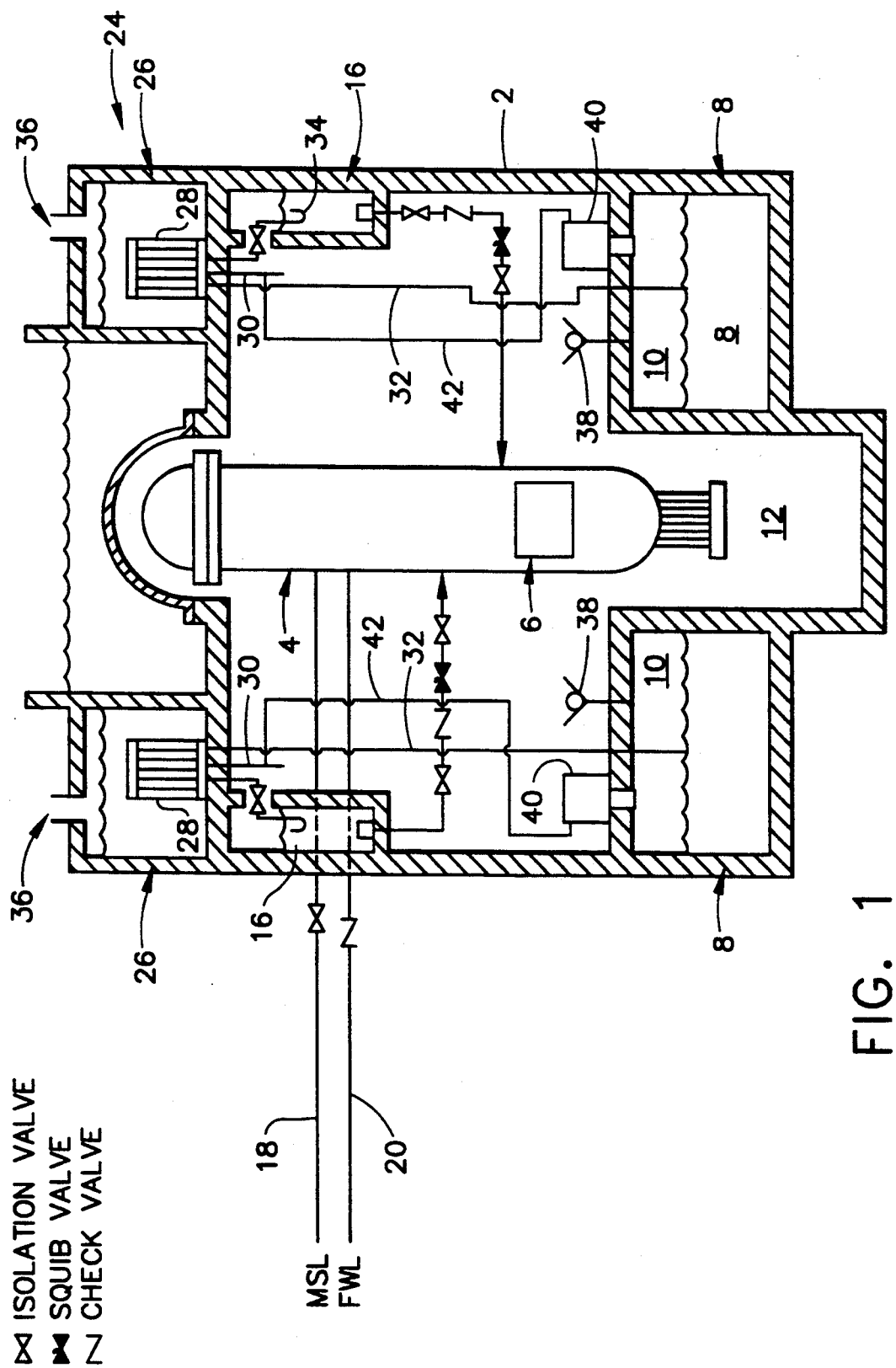
FIG. 1 is a simplified schematic depiction of a nuclear reactor system having a passive safety system in accordance with a preferred embodiment of the invention.

The passive safety system in accordance with the invention is incorporated in a BWR (see FIG. 1) comprising a primary containment vessel (PCV) 2, a reactor pressure vessel (RPV) 4 surrounded by PCV 2, a nuclear fuel core 6 arranged inside RPV 4, a suppression pool 8 of water having a wetwell headspace 10, a drywell 12 located inside PCV 2 and outside RPV 4, a gravity-driven cooling system (GDCS) 16 located within the drywell, and a PCCS 24 located above the drywell. The preferred embodiment of the invention comprises a means for regulating the drywell pressure as described in detail below.

The GDCS 16 provides reactor vessel inventory to the annulus region of the reactor after a LOCA and reactor depressurization. The GDCS provides cooling water under force of gravity from water pools located within the drywell at an elevation above the active core region to replace RPV water inventory lost during a LOCA event and subsequent decay heat boil-off. The GDCS is placed in the PCV 6 at the same regional elevation of the main steam line (MSL) 18. A check valve is provided in the line leading to the RPV to eliminate any backflow from the RPV to either GDCS pool. The GDCS pools have a sufficient supply of water to flood the RPV to a depth above the fuel rods.

The GDCS supplies reactor water after a time delay of approximately 1-3 hr after the initial low-level signal is received, at which time the GDCS squib valves are fired electrically to open. Upon opening of the squib valves, the gravity head causes water from the GDCS pools to flow into the RPV 2.

The check valves prevent backflow to the GDCS pools after the squib valves are actuated and the vessel pressure is still higher than the pool pressure plus its gravity head. Once the vessel pressure has decayed below the pool pressure, the differential pressure will open the check valve and allow water to begin flowing into the vessel.

The PCCS 24 maintains PCV 2 within its pressure limits for design basis accidents and operates by natural circulation. The PCCS is initially driven by the pressure difference created between the containment drywell and the wetwell during a LOCA and then by gravity drainage of steam condensed in the tubes, so the PCCS requires no sensing, control, logic or power-actuated devices to function. The PCCS is an extension of the safety-related containment and has no isolation valves.

The PCCS consists of two low-pressure, totally independent loops, each loop containing a condenser 28 that condenses steam and transfers heat to water in a large condenser pool which is vented to atmosphere. Each condenser is submerged in a respective compartment of a condenser pool 26 located high in the reactor building at approximately the same elevation as the fuel pools (not shown). The condenser pool is above and outside of the drywell (see FIG. 1). Each condenser is designed to discharge into a single GDCS pool 16.

Each condenser 28 has an upper drum and a lower drum connected by condenser tubes. A steam-gas mixture enters the respective condenser through an intake duct 30 directly from the drywell, so that no valves need be opened and the PCCS is always in a "ready standby" mode. The steam is then condensed in the condenser tubes and falls to the lower drum. From the lower drum, non-condensable gases can be vented through a line 32 which is submerged in suppression pool 8. The condensed water is drained to the GDCS pool 16. A U-shaped bend 34 in the pipeline in the GDCS pool forms a water trap that prevents steam from entering condenser 28 from the GDCS pool airspace.

Figure 2:
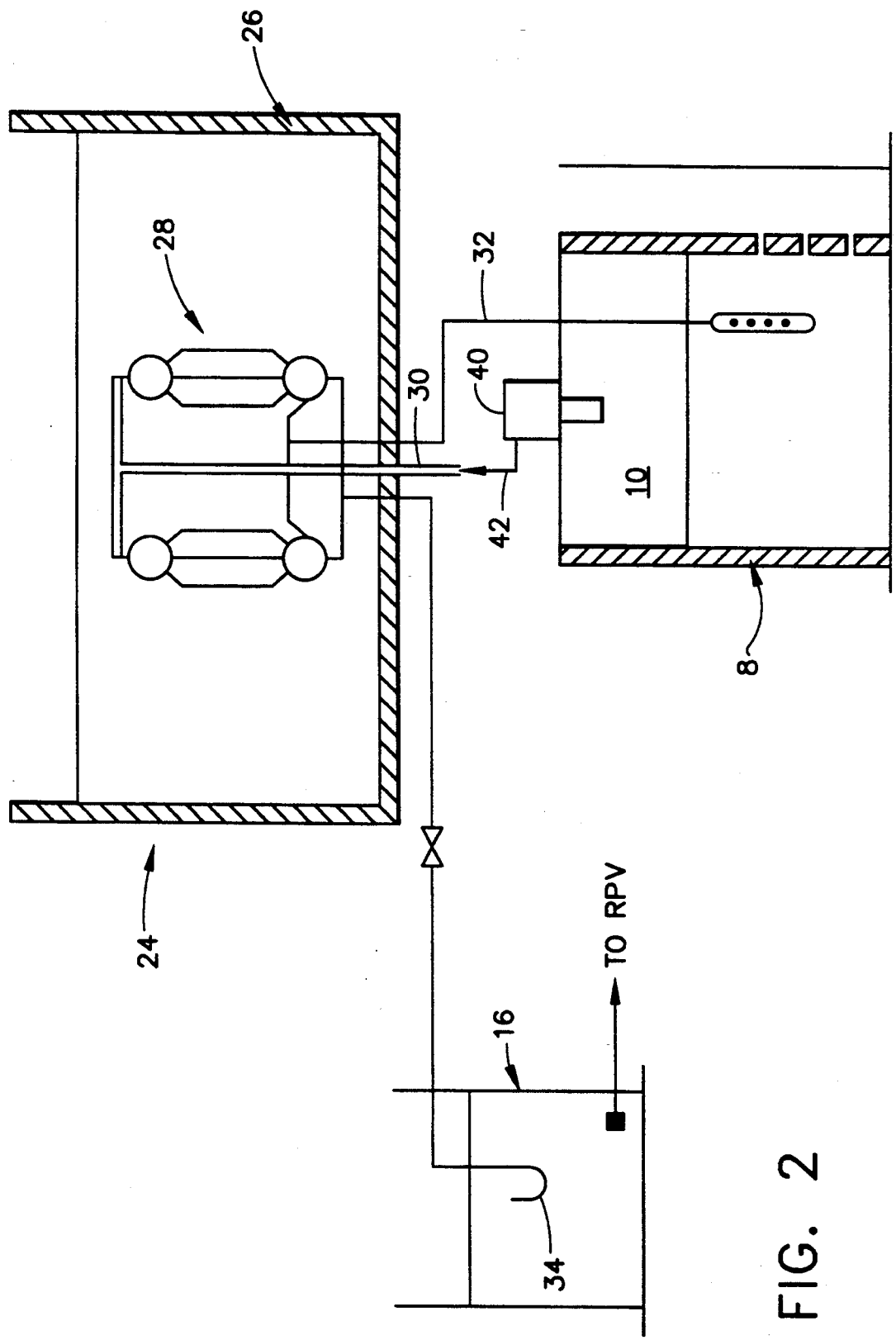
FIG. 2 is a simplified schematic depiction of a passive containment cooling system incorporated in the passive safety system of the invention.

Heat from condenser 28 will cause the condenser pool temperature to rise to its boiling point. The resulting steam vents outside the reactor building. A continuous circulation of steam enters the condenser, is condensed and then flows to the GDCS pool, thus removing containment heat. A GDCS line, which is part of the GDCS system, is shown in FIG. 2 connecting the GDCS pool 16 to the RPV. This line is intended to show the capability for the condensed PCCS water that enters the GDCS pool to subsequently return to the RPV.

Each condenser 28 is made of two identical modules. The two condensers provide containment cooling after a LOCA and limit containment pressure to less than its design pressure for at least 72 hr after a LOCA. Each condenser has a central steam intake duct 30 which is open to the drywell 12 at its lower end and which feeds two horizontal headers through two branch pipes at its upper end. Steam is condensed inside vertical tubes and the condensate is collected in two lower headers. The vent and the drain lines from each lower header are routed to the drywell through a single containment penetration. The condensate drains into an annular duct around the vent pipe and then flows in a line which connects to a large common drain line that also receives flow from the other header.

Condenser pool water can heat up to about 101° C. (214° F.). The steam which is formed, being nonradioactive and having a slight positive pressure relative to ambient pressure, is vented from the steam space above the condenser pool. The steam is released to the atmosphere through large-diameter discharge vents 36.

In the event of an emergency condition, the PCCS will eventually purge all of the nitrogen from the drywell 12 to the wetwell 10. Ultimately the rate of PCCS heat removal will exceed the rate at which decay heat is produced by the reactor core 6. As a result, the drywell pressure will decrease to a level slightly below the wetwell pressure, which causes the WWVBs 38 to open.

Figure 3:
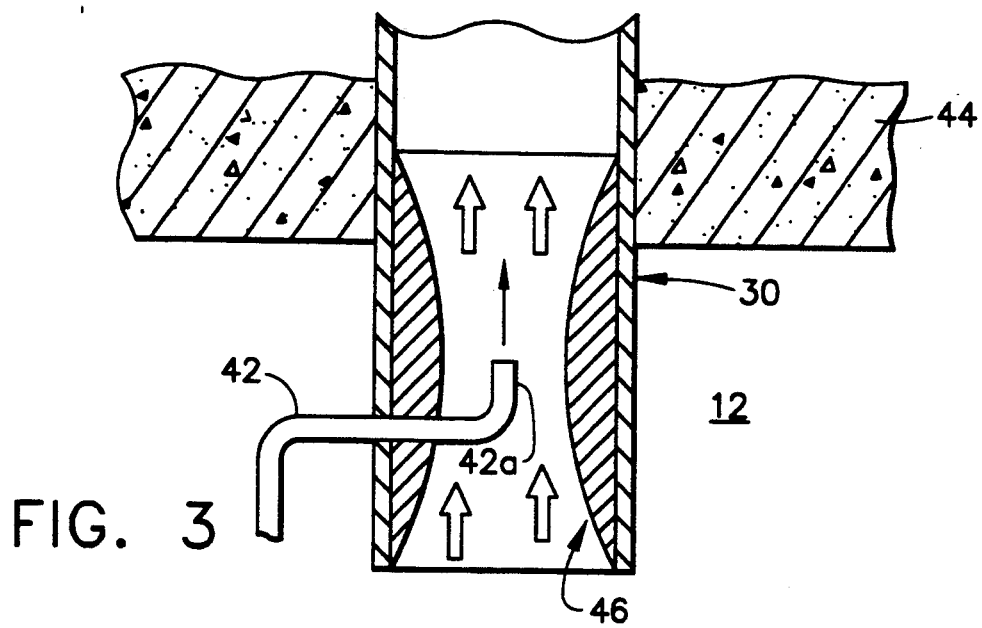
FIG. 3 is a schematic depiction of an intake duct of a passive containment cooling system in accordance with a preferred embodiment of the invention.

In accordance with the present invention, opening of the WWVBs can be prevented by placing a PCCS regulating valve (PCC-RV) 40 in flow communication with wetwell 10 and then connecting PCC-RV 40 to the PCC intake duct 30 via a supply line 42. The details of this connection are shown in FIG. 3.

The PCCS intake duct 30 penetrates the drywell ceiling 44. In practice, intake duct 30 has a diameter of about 10 inches. A venturi nozzle 46 can optionally be installed in the mouth of intake duct 30 to accelerate the gas flow into the condenser. This feature can be used to reduce the pressure in the PCC-RV to slightly below the drywell pressure if desired.

The supply line 42 penetrates the walls of the intake duct and the venturi in a generally radial direction and then ends in an outlet portion 42a which is generally concentric with the axis of the venturi. The diameter of outlet portion 42a must be substantially less than the diameter of the venturi throat to ensure adequate gas flow from the drywell through the venturi.

Figure 4:
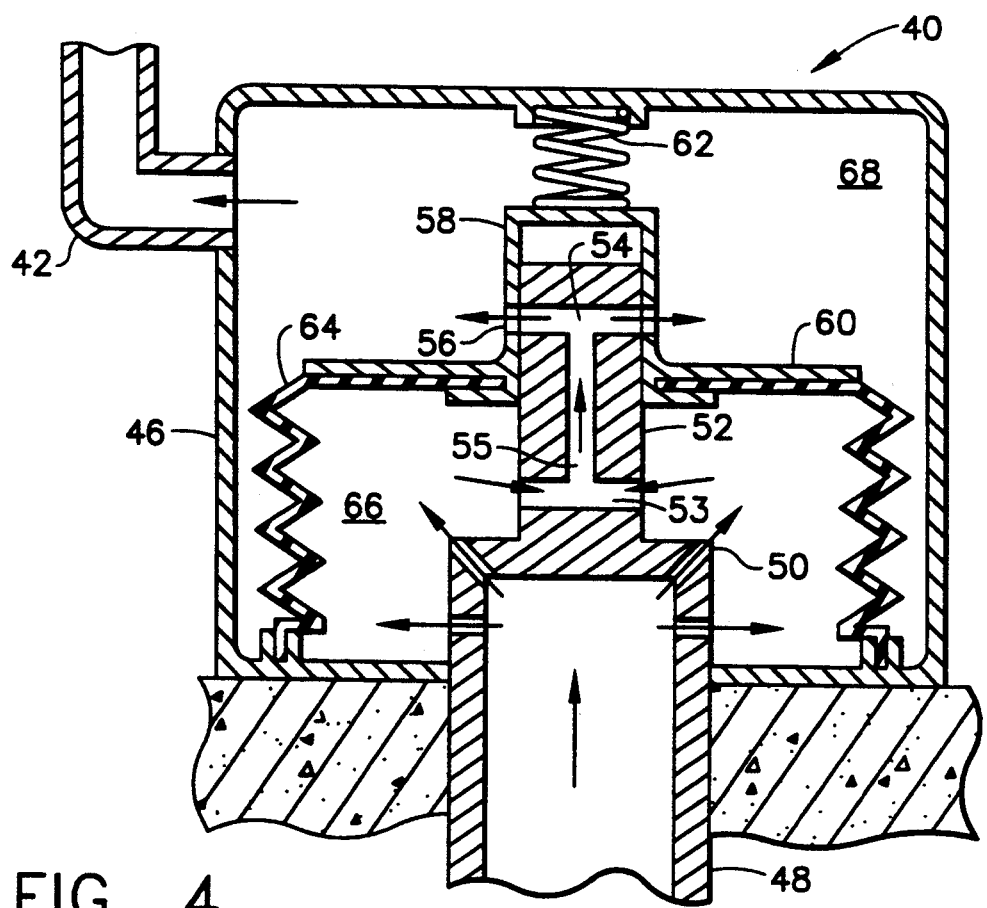
FIG. 4 is a schematic depiction of a regulating valve of a passive containment cooling system in accordance with a preferred embodiment of the invention.

The PCC-RV 40 must be designed to open in response to a predetermined pressure differential. Preferably the flow rate out of the regulating valve increases with increasing differential pressure. An exemplary embodiment of a PCC-RV which functions in accordance with the foregoing requirements is shown in FIG. 4. PCC-RV 40 comprises a housing 46 having two ports: one which receives PCC supply line 42 and the other which receives a pipe 48 having an axial flow channel in flow communication with wetwell 10. Pipe 48 also has a plurality of ports 50 in flow communication with the axial flow channel and with a volume 66 partly defined by a bellows 64. A piston-like valve seat 52 is connected to the end of pipe 48 and preferably is unitarily formed therewith. Valve seat 52 has ports 53 in flow communication with volume 66 and ports 54 which, when PCC-RV 40 is open, are in flow communication with supply line 42 via a volume 68 formed between housing 46 and bellows 64. Ports 53 are in flow communication with ports 54 via an axial flow channel 55 formed inside valve seat 52.

The bellows 64 is expandable/retractable in a direction parallel to the axis of valve seat 52. One end of the bellows is mounted on the bottom wall of housing 46 and the other end is mounted on an annular disk 60 which is integrally connected to an open end of a cylinder 58. Cylinder 58 receives and reciprocates along the piston-like valve seat 52. The other end of cylinder 58 is closed and supports a compression spring 62, which urges cylinder 52 downward with a predetermined spring force. The spring force exerted by spring 62 can be adjusted to a desired level. In addition, the pressure inside volume 68, corresponding to the drywell pressure adjusted for conditions at the PCCS intake duct, exerts an additional downward force on the cylinder 58/disk 60.

Bellows 64 is made of corrosion-resistant metal and exerts an upward spring force on cylinder 52. When the bellows is expanded by incoming gas from the wetwell, the upward force exerted by the bellows is the sum of its spring force and the wetwell gas pressure inside volume 66. When this combined force exceeds the counterforce exerted by spring 62 and the drywell pressure in volume 68, cylinder 58 is displaced upward. As cylinder 58 moves upward, the force opposing bellows expansion increases until an equilibrium is reached. When in equilibrium, further movement of cylinder 58 requires an increase in the wetwell-to-drywell differential pressure, e.g., a decrease in drywell pressure.

As cylinder 58 displaces upwardly in response to decreasing drywell pressure, the amount of overlap of ports 56 with respective ends of port 54 increases, until a condition of full overlap (see FIG. 4), corresponding to PCC-RV 40 being fully open, is reached. This gradually opening of PCC-RV 40 in response to gradually decreasing drywell pressure produces an increasing flow of nitrogen gas from the wetwell to the PCCS intake duct 30 sufficient to reduce PCC heat removal from the drywell, i.e., sufficient to terminate the reduction in drywell pressure. By proper selection of the dimensions and geometry of supply line 42 and PCC-RV 40 and the precise location of outlet 42a, a desired wetwell-to-drywell pressure differential can be maintained that avoids activation of the WWVBs.

The foregoing improvement to the PCCS design has the benefit of eliminating or minimizing steam leakage from the drywell to the wetwell in the longer-term post-LOCA time period and also minimizes the temperature difference between drywell and wetwell. This in turn reduces the rate of long-term pressure buildup of the containment, thereby extending the time to reach the design pressure limit.

In accordance with the invention, each condenser of the PCCS will have its intake duct connected to a corresponding regulating valve of the type disclosed herein. Thus, the number of regulating valves will depend on the number of condensers.

The foregoing preferred embodiment of the invention has been disclosed for the purpose of illustration. Variations and modifications of the disclosed apparatus will be readily apparent to practitioners skilled in the art of passive safety systems for BWRs. For example, any person skilled in the art of valve design could readily design a regulating valve equivalent in function to the valve disclosed herein, but having a different structure. All such variations and modifications are intended to be encompassed by the claims set forth hereinafter.

I claim:

1. In a boiling water reactor comprising a primary containment vessel, a reactor pressure vessel surrounded by said primary containment vessel with a drywell therebetween, a nuclear fuel core arranged inside said reactor pressure vessel, a suppression tank having a suppression pool of water therein and a wetwell headspace overlying said suppression pool, a condenser pool of water arranged above said drywell, a condenser submerged in said condenser pool, a condenser inlet flow path for coupling steam from said drywell into said condenser, a first condenser outlet flow path for coupling steam from said condenser into said suppression pool, and a second condenser outlet flow path for removing condensate from said condenser, the improvement wherein said condenser inlet flow path is coupled to said wetwell by a supply line connected to a regulating valve, said regulating valve having an open state when a differential pressure therein is greater than a predetermined threshold and a closed state when said differential pressure is less than said predetermined threshold.

2. The boiling water reactor as defined in claim 1, wherein said regulating valve comprises a housing and a bellows arranged inside said housing, a first volume inside said housing and outside said bellows being in flow communication with said supply line and a second volume inside said bellows being in flow communication with said wetwell, said differential pressure being the difference between the pressure in said first volume and the pressure in said second volume.

3. The boiling water reactor as defined in claim 2, wherein said regulating valve further comprises piston means having first port means and cylinder means having port means, said piston means and said cylinder means being coupled for mutual reciprocation, the port means of said cylinder means being in flow communication with said first volume and the port means of said piston means being in flow communication with said second volume.

4. The boiling water reactor as defined in claim 3, wherein said cylinder means is joined to a displaceable portion of said bellows, said cylinder means having a first position at which its port means are not in fluid communication with the port means of said piston means and a second position at which its port means are in fluid communication with the port means of said piston means, said cylinder means displacing from said first position to said second position in response to a predetermined decrease in drywell pressure.

5. The boiling water reactor as defined in claim 1, wherein said regulating valve has a first volume in flow communication with said drywell via said supply line and said condenser inlet flow path, a second volume in flow communication with said wetwell, and means for placing said first and second volumes in flow communication in response to a predetermined drywell pressure.

6. The boiling water reactor as defined in claim 4, further comprising spring means for urging said cylinder means toward said first position.

7. The boiling water reactor as defined in claim 4, further comprising a regulating valve inlet flow path which penetrates a ceiling of said wetwell and via which said second volume is in flow communication with said wetwell.

8. The boiling water reactor as defined in claim 1, wherein said supply line has an outlet which empties into said condenser inlet flow path.

9. The boiling water reactor as defined in claim 8, wherein said condenser inlet flow path comprises an intake duct which penetrates a ceiling of said drywell, said intake duct having a wall which is penetrated by said supply line.

10. The boiling water reactor as defined in claim 8, wherein said condenser inlet flow path comprises a venturi.

11. A method for regulating drywell pressure during cooling of the primary containment vessel of a nuclear reactor having a drywell and a wetwell, comprising the steps of:
venting a portion of a gas mixture from the drywell into a condenser via an intake duct;
removing heat from said portion of said drywell gas mixture vented into said condenser by condensing any steam included in said portion of said drywell gas mixture;
purging nitrogen gas from said portion of said drywell gas mixture to said wetwell; and
injecting a portion of a gas mixture from the wetwell into said portion of said drywell gas mixture which is flowing inside said intake duct in response to a predetermined drywell pressure.

12. The method as defined in claim 11, further comprising the step of adjusting the amount of wetwell gas mixture admitted to said vented drywell gas mixture to maintain a predetermined difference between the wetwell pressure and the drywell pressure.

13. The method as defined in claim 11, further comprising the step of transferring just enough nitrogen from said wetwell to said vented drywell gas mixture to decrease the rate at which heat is being removed from said drywell gas mixture.

14. The method as defined in claim 11, further comprising the step of transferring just enough nitrogen from said wetwell to said vented drywell gas mixture to terminate the reduction in drywell pressure attributable to heat being removed from said drywell gas mixture.

15. A boiling water reactor comprising a drywell, wetwell, means for removing heat from a gas, intake means for venting a gas mixture from said drywell to said heat removing means, means for purging nitrogen gas from said drywell gas mixture to said wetwell, and means for admitting gas mixture from said wetwell into the vented drywell gas mixture in response to a predetermined drywell pressure, wherein said admitting means comprises a supply line in flow communication with said intake means and a regulating valve having a first chamber in flow communication with said wetwell and a second chamber in flow communication with said supply line.

16. The boiling water reactor as defined in claim 15, wherein said regulating valve has an open state when a differential pressure between said first and second chambers is greater than a predetermined threshold and a closed state when said differential pressure between said first and second chambers is less than said predetermined threshold.

17. The boiling water reactor as defined in claim 15, wherein said regulating valve comprises a housing and a bellows arranged inside said housing, said first chamber being formed by a first volume inside said housing and outside said bellows and said second chamber being formed by a second volume inside said bellows.

18. The boiling water reactor as defined in claim 17, wherein said regulating valve further comprises piston means having first port means and cylinder means having port means, said piston means and said cylinder means being coupled for mutual reciprocation, the port means of said cylinder means being in flow communication with said first volume and the port means of said piston means being in flow communication with said second volume, and said cylinder means being joined to a displaceable portion of said bellows, said cylinder means having a first position at which its port means are not in fluid communication with the port means of said piston means and a second position at which its port means are in fluid communication with the port means of said piston means, said cylinder means displacing from said first position to said second position in response to a predetermined decrease in drywell pressure.

19. The boiling water reactor as defined in claim 16, wherein said intake means comprises a venturi and said supply line has an outlet which empties into said venturi.

* * * * *